Figure 1:
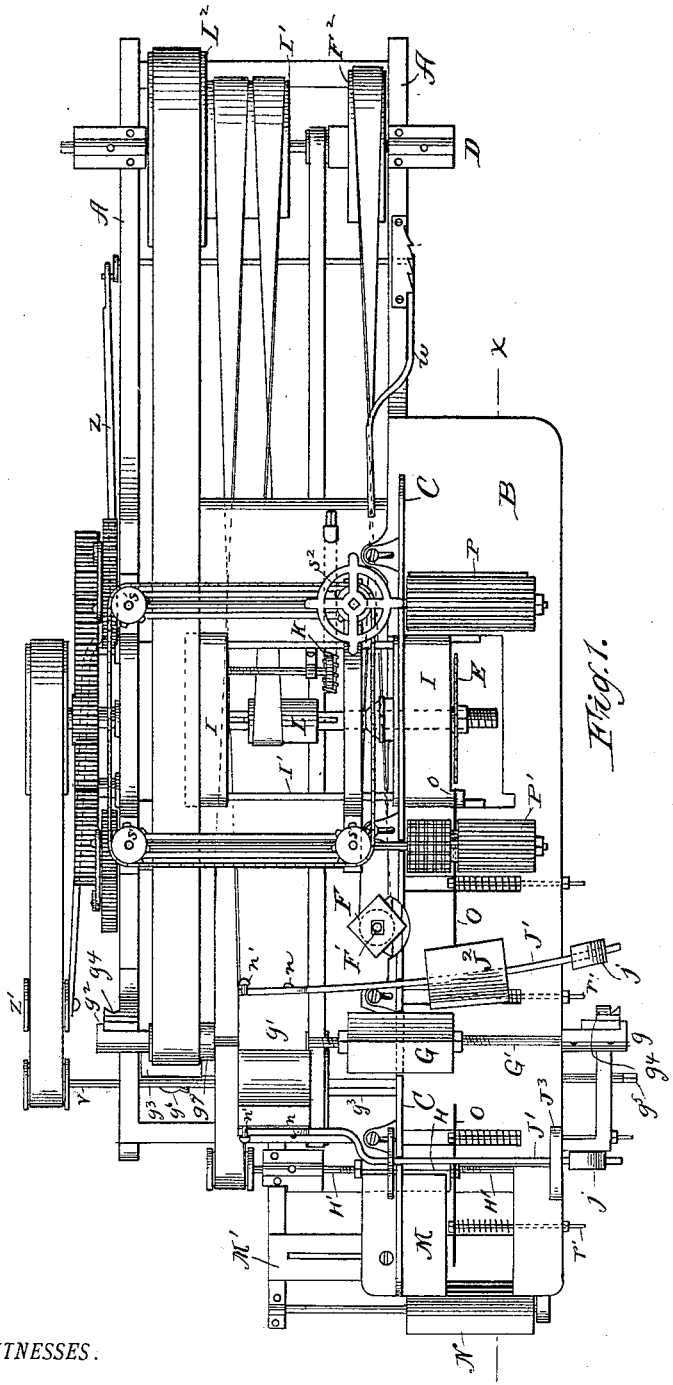

(No Model.) 3 Sheets—Sheet 1.

O. R. DOBBROTH.
WOOD WORKING MACHINE.

No. 390,760. Patented Oct. 9, 1888.

WITNESSES.

INVENTOR,
Otto R. Dobbroth
BY
ATTORNEY.

(No Model.) 3 Sheets—Sheet 2.
O. R. DOBBROTH.
WOOD WORKING MACHINE.
No. 390,760. Patented Oct. 9, 1888.
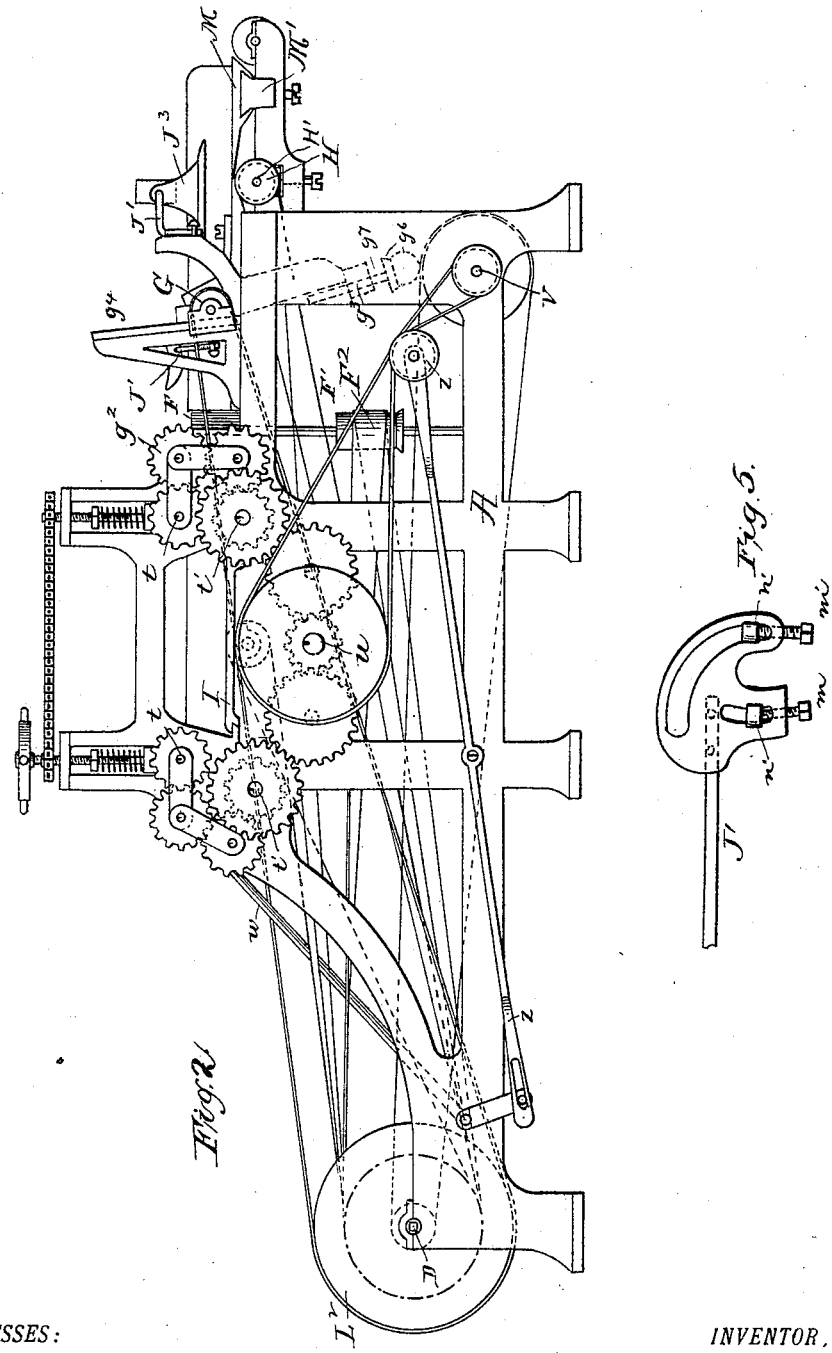
WITNESSES:
C. N. Benjamin.
M. A. Rosenbaum.
INVENTOR,
Otto R. Dobbroth,
BY W. B. Johnston
ATTORNEY.

(No Model.) 3 Sheets—Sheet 3.
O. R. DOBBROTH.
WOOD WORKING MACHINE.
No. 390,760. Patented Oct. 9, 1888.
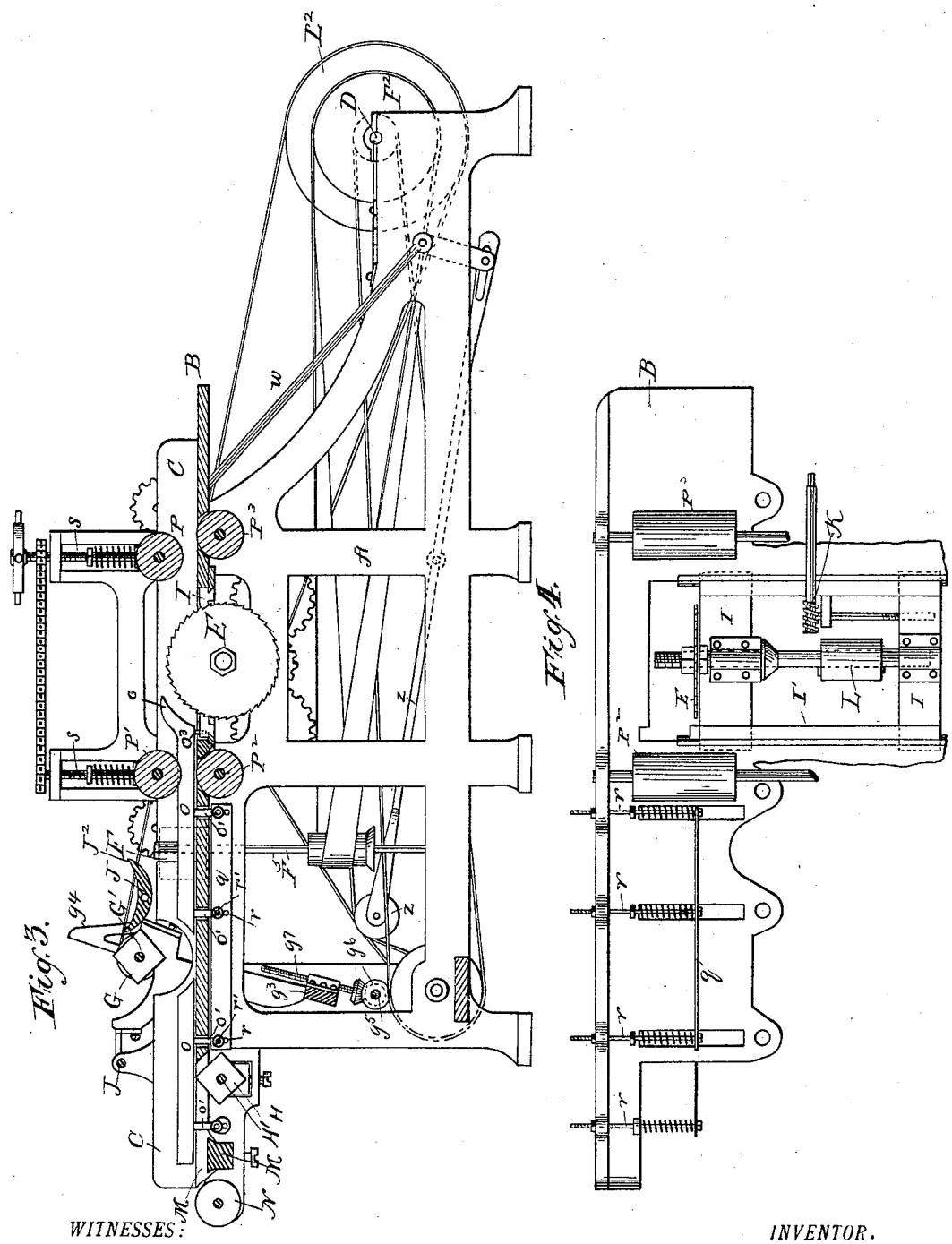
WITNESSES:
C. W. Benjamin.
W. W. Rosenbaum.
INVENTOR.
Otto R. Dobbroth.
BY
W. B. Johnston.
ATTORNEY.

UNITED STATES PATENT OFFICE.

OTTO R. DOBBROTH, OF CHICAGO, ILLINOIS.

WOOD-WORKING MACHINE.

SPECIFICATION forming part of Letters Patent No. 390,760, dated October 9, 1888.

Application filed April 30, 1888. Serial No. 272,237. (No model.)

*To all whom it may concern:*

Be it known that I, OTTO R. DOBBROTH, a citizen of the United States, residing at Chicago, in the county of Cook and State of Illinois, have invented certain new and useful Improvements in Wood-Working Machines; and I do hereby declare that the following is a full, clear, and exact description of my invention, such as will enable others skilled in the art to which it appertains to make and use the same.

My invention has reference to wood-working machines.

The primary object of the invention is to provide a machine which will perform several operations upon a strip of lumber in a single passage of the same through the machine. For instance, a strip of lumber in passing through the machine may have any desirable width ripped from it and molded into any desired form.

The machine which I have invented is provided with a rip-saw and with a cutter which dresses one side of the board, and two other cutters which dress, respectively, the top and bottom of the board. The side boards or adjustable gages for limiting the width of the material ripped, which are found in the ordinary machines of this class, are disposed of in my improved machine. The same side boards are retained by me, however; but they are not adjustable to different widths of material. This adjustment is accomplished by other devices, which will be fully hereinafter described. The adjustment of the feed-rollers, together with the gearing which drives them, are also matters which will be described hereinafter, and pointed out in the claims.

Referring to the accompanying drawings, which form a part of this specification, Figure 1 represents a plan of my improved machine; Fig. 2, a side elevation; Fig. 3, a vertical longitudinal section along line *x x* of Fig. 1. Fig. 4 is a view of the under side of the table. Fig. 5 is a detail.

A represents the main frame of the machine.

B represents the table over which the lumber passes.

C represents the ordinary ledge or gage, against which the inner edge of the lumber is pressed while passing through the machine. This gage in my improved machine has a lateral adjustment for regulating the cut of cutter F, and not for the purpose of regulating the width of the board ripped off.

The pulley-shaft D of the machine is at the forward end, and carries a series of graduated pulleys, which connect by suitable belting with the different cutters and feeding devices of the machine.

E represents a circular rip-saw; F, a dressing-cutter for the inner edge of the board; G, a cutter for the top side of the board, and H a cutter for the under side. In this machine the saw E is laterally adjustable, and for that purpose is mounted in a sliding frame, I, working on ways I' in the main frame. This sliding frame is adjusted by means of a worm and gear, K, operated by a key or crank. The gear-shaft enters a threaded hole in a portion of the frame I, and moves it in or out, according to the direction in which the shaft turns. The saw-shaft has mounted upon it a driving-pulley, L. This pulley slides on a spline when the frame moves, and thus maintains its position in the same plane with its connecting driving-pulley L'. The cutter F is on the head of a vertical shaft, F', and is driven by belt from the pulley $F^2$. This cutter may be a planer for smoothing the inner edge of the board, or it may be a tool for cutting a bead or any desired form of molding. It works on the board through an opening or break in the gage C. The cutter G dresses the board on its upper side. This cutter may be either a planer or any form of molding-cutter. It is mounted on the shaft G', and is held in place thereon by means of clamping-nuts at each end, which work on the threaded shaft and by means of which the cutter may be moved longitudinally upon the shaft to act upon different widths of board. The shaft G' is mounted in bearings $g$, $g'$, and $g^2$, and it is driven by pulley $g^7$ from pulley $L^2$. The bearings are fixed to a movable frame, $g^3$, which is adapted to slide upon inclined ways $g^4$, forming a part of the main frame. The frame $g^3$ is adjustable vertically by means of a crank-shaft $g^5$, upon which are fixed two bevel-pinions, $g^6$ $g^6$, gearing with other pinions connected with short upright shafts $g^8$, passing into threaded holes or lugs in the frame $g^3$. By turning the shaft $g^5$ the frame is moved up or down, according to the direction in which the crank is turned.

It will be seen that this adjustment of frame $g^3$ also adjusts the position of the cutter G for different thicknesses of lumber. Connected with the bearing $g'$ are brackets on either side thereof, to which are pivoted and secured arms J' J' by means of a pivot-bolt, $n$, and a bolt, $n'$. These arms extend laterally over the table and carry pressure-shoes $J^2 J^3$, which rest upon the board and prevent it from vibrating while it is being acted upon by the knives. The arms have at their outer ends an adjustable weight, $j$, for regulating to some extent the pressure. The positive pressure, however, is regulated by two set-screws, $m$ $m'$, which bear upon the bolts $n$ $n'$ in the manner shown in Fig. 5. By setting up these screws to a greater or less extent the pressure of the shoe upon the board is regulated accordingly. The bolt $n'$ is located in a segmental slot, in order that the arm may be raised and thrown back when the cutters are adjusted.

The cutter H is mounted on a shaft, H', fixed in vertically-adjustable bearings. The shaft is driven by belt from the pulley L'. The cutter is adjustable longitudinally on the shaft for different widths of board. This cutter usually is nothing more than a planer; but it may be provided with any other form of cutting-knives. To the rear of this cutter is a sliding table, M, which is adjustable laterally and vertically on a slide, M'. That portion of the board which is being dressed is supported by this table after it leaves the cutter H. Roller N then assists the discharge of the board. In order to provide for holding the board up against the ledge C and against the cutter F, and also to assist in preventing vibrations of the board, I have provided what I term "pressure" plate or plates O. Two of these plates are provided, one just in the rear of the saw and the other near the cutter H. The plates stand upright on the table, and are also in the same plane with the saw. The forward end of plate O has an upwardly-projecting finger or horn, $o$, which serves as a wedge to enter the saw-kerf. The plates have downwardly-projecting lugs $o'$, which extend through slots in the main table into a connecting-piece located beneath the table. At the point where the lugs enter the cross-piece $q$ two perforations are provided, which receive lateral rods $r$ $r'$. These rods extend through the cross-piece and the lugs. The lower one, $r$, is provided with set-nuts on each side of the cross-piece and at the outer end on each side of a flange on the frame, by means of which the rod and cross-piece $q$ may be adjusted and held in a fixed position. The other rod, $r'$, is provided with set-nuts at the outer end only, the inner end passing loosely through the upper perforation in the cross-piece. An adjustable nut plays on the rod, and between it and the cross-piece a coil-spring is inserted, which presses constantly against the cross-piece, the tendency being to force the cross-piece inward and carry the plate O with it. The nut on the rod $r$ is of course adjustable to regulate the pressure of the spring.

At the forward end of the plate, directly under the finger $o$, is a pin, $o^3$, which fits into a hole in the sliding saw-frame. This hole is in a direct line with the saw and serves to hold the forward end of the plate constantly in that fixed position, so that when the board has passed the saw the two parts of it are separated by the plates. The plates are thickened toward the end, in order to part the two severed pieces of board.

The feed-rollers are represented by P P' $P^2$ $P^3$. The roller P' is made up of a series of collars, in order that a space may be left for the pressure-plate at whatever point the plate may be secured. The shafts of the upper feed-rollers are mounted in adjustable spring-bearings, in order to accommodate different thicknesses of board, and also to provide for the easy passage of a board having an uneven thickness. The bearings are adjusted by means of upright shafts $s$, each extending through the top of the frame and surmounted by a sprocket-wheel, $s'$. These wheels are all connected by a sprocket-chain, and one of the shafts also has a hand-wheel, $s^2$. The turning of one will cause a corresponding motion in all of the shafts, thus adjusting all the bearings to the same degree and at the same time. The gearing through which the feed-rollers are driven is shown in Fig. 2.

$t$ and $t'$ represent the shafts of the feed-rollers, on the end of which are mounted pinions which connect by intermediate gearing with a pinion on the shaft $u$. I have provided link-gears, as shown, in order to keep the wheels in mesh when the feed-roller shafts are adjusted. A band-wheel on shaft $u$ is driven by belt from the shaft $v$, and shaft $v$ derives its motion through a belt on the main driving-shaft.

The belt connecting shafts $u$ and $v$ is a loose one, but is adapted to be tightened by means of a pivoted lever, $z$, carrying a roller, $z'$, at one end, which presses against the belt, and the other end is connected with a crank and a lever, $w$, which is manipulated by the operator of the machine.

The location and arrangement of the different cutters are matters to be determined by the builder.

I do not limit myself to any particular arrangement, but have shown an arrangement which seems to me to be very practical. The driving mechanism is also a matter discretional with the builder.

Having described my invention, I claim—

1. In a wood-working machine, the combination, with a rip-saw, of a plurality of cutters for trimming or finishing three surfaces of the lumber, and a separator and spring-clamp combined, for separating the portion undergoing the action of the cutters from the remaining portion and for preventing the vibration of the former portion, as set forth.

2. The pressure-plate O, provided with lugs extending through slots in the table of the machine and connecting with the cross-piece beneath said table, in combination with adjustable securing-rods $r'$, and rods $r$, carrying springs which press against the said cross-piece and tend to force the plate O against the board.

3. In combination with a laterally-adjustable saw-frame provided with a hole or socket directly in the rear of the saw, a pressure and separating plate, O, provided with a finger or lug, $o^3$, which fits into the hole or socket in the said frame, and means for adjusting the said saw-frame and the said plate.

4. The combination of a laterally-adjustable saw-frame and saw, a laterally-adjustable separating-plate, and an adjustable sectional feed roller, for the purpose set forth.

In witness whereof I have hereunto signed my name in the presence of two subscribing witnesses.

OTTO R. DOBBROTH.

Witnesses:
EDWARD RICHARDSON,
ERNST KNOBELSDORFF, Jr.